United States Patent [19]

Matsui

[11] Patent Number: 5,763,030
[45] Date of Patent: Jun. 9, 1998

[54] BIAXIALLY STRETCH BLOW-MOLDED ARTICLE AND BOTTOM MOLD THEREFOR

[75] Inventor: Tsuyoshi Matsui, Ueda, Japan

[73] Assignee: Nissei ASB Machine Co., Ltd., Nagano-ken, Japan

[21] Appl. No.: 530,432

[22] Filed: Sep. 19, 1995

Related U.S. Application Data

[62] Division of Ser. No. 348,809, Nov. 28, 1994, Pat. No. 5,511,966.

[30] Foreign Application Priority Data

Nov. 29, 1993 [JP] Japan .................. 5-323147

[51] Int. Cl.$^6$ ................................ B65D 90/12
[52] U.S. Cl. .............. 428/35.7; 428/36.92; 428/910; 215/374; 220/606; 264/532
[58] Field of Search .................. 215/370, 371, 215/376, 373, 374, 372; 428/35.7, 36.92, 910; 220/606; 264/523, 532, 537

[56] References Cited

U.S. PATENT DOCUMENTS

| | | | |
|---|---|---|---|
| 4,025,275 | 5/1977 | Gournelle | 425/403 |
| 4,502,607 | 3/1985 | Szajna | 425/522 |
| 4,950,514 | 8/1990 | Strassheimer | 428/36.92 |
| 4,997,692 | 3/1991 | Yoshino | 428/36.92 |
| 5,198,248 | 3/1993 | Krishnakumar et al. | 425/522 |
| 5,229,142 | 7/1993 | Yokobayashi | 425/522 |
| 5,411,699 | 5/1995 | Collette et al. | 425/522 |

FOREIGN PATENT DOCUMENTS

| | | |
|---|---|---|
| 58-67719 | 5/1983 | Japan . |
| 2-36456 | 8/1990 | Japan . |

*Primary Examiner*—Rena Dye
*Attorney, Agent, or Firm*—Oliff & Berridge, PLC

[57] ABSTRACT

A biaxially stretch blow-molded article, particularly adapted for hot fill applications, having an improved bottom configuration. The bottom has grounding bottom portion and a central inwardly concave dome inside of the grounding bottom portion. The central inwardly concave dome has annular flat walls at different levels from the grounding bottom portion. The annular flat walls are defined by polygons of similar figures. An angle of one of the polygons is aligned along a radial line connecting a bisected point of one side of an adjacent upper or lower polygon and the center of the central inwardly concave dome. The angles of the polygons are the highly stretched areas having a high latitudinal stretch ratio, while the sides of the polygons particularly around the center point, are the moderately stretched areas. The highly and the moderately stretched areas are alternately arranged around the central inwardly concave dome in the circumferential and radial directions.

13 Claims, 5 Drawing Sheets

BIAXIALLY STRETCH BLOW-MOLDED ARTICLE AND BOTTOM MOLD THEREFOR

This is a Division of application Ser. No. 08/348,809 filed Nov. 28, 1994, now U.S. Pat. No. 5,511,966.

BACKGROUND OF THE INVENTION

1. Field of the Invention

This invention relates to a biaxially stretch blow-molded article and particularly to such an article having an improved base configuration and a bottom mold therefor.

2. Description of the Prior Art

As is well-known, biaxially stretch blow-molded articles such as containers made from polyethylene terephthalate resin (PET) are now in wide use, and are advantageous in their features such as good gas proofing, transparency, rigidity, and hygiene.

These containers are frequently used for so-called "hot-fill" applications where the beverage or liquid is dispensed in the container initially at a raised temperature, for the purpose of sterilization.

As the hot-filled liquid cools, it shrinks in volume reducing pressure in the container, and thus deforming a barrel portion of the container. To cope with volume shrinkage and pressure reduction, such containers have particular areas of the barrel portions deformed beforehand and a plurality of collapse panels are provided on the barrel portions thereof.

Such containers of a self-standing type have a bottom referred to as a "champagne bottom", in which a central inwardly concave dome is formed in an inner grounding bottom portion. The container having the champagne bottom is prone to a problem that its bottom is deformed by the hot-filled liquid for the following reasons.

Usually, the bottom is not adequately stretched and thinned down compared with the barrel portion. Although the bottom is stretched and oriented to a certain degree, molecules in the container resin are highly unstable at this point. Generally, if the container is not oriented and crystallized adequately, neither good resistance to heat nor mechanical strength can be provided. Therefore, when the hot liquid is dispensed thereinto, the container tends to return to its original configuration, i.e. a preform configuration prior to the blow molding.

For the foregoing reasons, the bottom of container tends to buckle or deform due to a raised temperature and the weight of the hot-filled liquid.

To overcome the foregoing problem, there is proposed a central concave bottom in the shape of a staircase. Conventionally, annular circular flat walls are created at different levels from the grounding bottom portions at the central inwardly concave dome. (Japanese Utility Model Application Laid-Open No. 58-67719 proposes such a bottom profile.) However, the central inwardly concave dome in the shape of a staircase increases its longitudinal stretch, but its latitudinal stretch is insufficient. Therefore, such a central inwardly concave dome is not oriented and crystallized latitudinally to a sufficient degree. Further, insufficient latitudinal stretch provides thick portions on one side of the bottom surface, and causes such thick portions on the bottom to be deformed extensively by heat. Though the bottom does not have good heat resistance uniformly on the entire region thereof, if a uniform thickness is provided in a circumferential direction, a deformation is substantially unnoticeable. However, partially thick portions of the bottom are prone to extensive deformation compared with thin portions, making the container aesthetically and commercially unacceptable.

Further, Japanese Patent Publication No. 2-36456 proposes a champagne bottom having concave portions and convex portions which extend radially of a central inwardly concave dome and which are alternately arranged circumferentially around the center of the bottom.

The champagne bottom of this configuration with deep concave and convex portions can be sufficiently stretched, so that it can maintain its aesthetic and commercial acceptability in spite of deformations due to uneven thickness. However, if the concave and convex portions are made deep, the formation of the bottom during the blow-molding is hindered. Since a sufficient amount of resin cannot be applied deep enough to the concave and convex portions, it is impossible to form such portions. To overcome this problem, a very high blow pressure should be applied. When the blow pressure is raised, it is necessary to increase the mold clamping force. Therefore, a mold clamping mechanism becomes large in a molding machine, which would lead to a new problem, i.e. an extended molding time. Further, it becomes necessary to prepare a complicated bottom mold for forming concave and convex portions on the bottom. This means that it becomes expensive to form the bottom since it takes time to prepare the bottom mold, and the number of manufacturing steps is increased.

SUMMARY OF THE INVENTION

It is therefore an object of the present invention to provide a biaxially stretch blow-molded article having an improved bottom which can be prevented from being deformed when filled with a hot liquid.

Another object of the invention is to provide a biaxially stretch blow-molded article having an improved bottom which can be protected against deformation and can be molded without increase of cost thereof.

A still further object of the invention is to provide a bottom mold which is used for biaxially stretching and blow-molding an article, and is relatively simple to manufacture.

According to a first aspect of the invention, there is provided a biaxially stretch blow-molded article comprising a bottom which includes a grounding bottom portion and a central inwardly concave dome being formed inside of said grounding bottom portion wherein:

said central inwardly concave dome comprises highly stretched areas and moderately stretched areas which are alternately formed circumferentially around the center of said bottom along contour lines each of which is located at a different level from said grounding bottom portion, and said highly stretched areas and said moderately stretched areas are alternately arranged radially of said center.

In this arrangement, the highly stretched areas and moderately stretched areas are alternately arranged at the central inwardly concave dome in the circumferential and radial directions. The highly stretched areas enhances heat resistance and mechanical strength of the central inwardly concave dome, and further reinforce the moderately stretched areas. Thus, the central inwardly concave dome can be prevented from buckling and being deformed when the article is filled with a hot liquid.

According to the first aspect, it is desirable to provide first portions and second portions which are closer to the center of the bottom than the first portions along each of the contour lines located at a different level of the central inwardly concave dome. The first portions are the highly stretched areas created by a high latitudinal stretch ratio, while the second portions are the moderately stretched areas created by a low latitudinal stretch ratio.

In a second aspect of the invention, there is provided a biaxially stretch blow-molded article comprising a bottom which includes a grounding bottom portion and a central inwardly concave dome being formed inside of said grounding bottom portion wherein:

said central inwardly concave dome comprises annular flat walls which are formed at different levels from said grounding bottom portion, said annular flat walls are defined by concentric polygons, and an angle of one of said polygons and an angle of an adjacent upper or lower polygon are arranged at different positions in a circumferential direction around said center of said bottom.

According to the second aspect, the angles of the polygons distant from the center of the bottom are the highly stretched areas. The sides of the polygons, especially the portions near the bisected points thereof, nearest to the center of the bottom are the moderately stretched areas. Therefore, the highly stretched areas and the moderately stretched areas are alternately arranged along the contour lines of the polygons. Since an angle of one of the polygons which define annular flat walls and an angle of an adjacent upper or lower polygon are arranged at different positions in a circumferential direction, the highly and the moderately stretched areas are also alternately arranged in a radial direction. Further, the annular flat walls in the shape of a staircase enhance the longitudinal stretch ratio of the central inwardly concave dome, and further reinforce the dome. The angles of the annular flat walls function as ribs preventing the central inwardly concave dome from buckling and deformation.

A bottom mold is used for molding a biaxially stretch blow-molded article having a bottom which includes a grounding bottom portion and a central inwardly concave dome being formed inside of said grounding bottom portion comprising:

a central convex dome having a cavity surface which defines an outer surface of said central inwardly concave dome of said article, said cavity surface having annular flat walls formed at different levels from a surface corresponding to an outer surface of said grounding bottom portion, said annular flat walls being defined by concentric polygons, wherein an angle of one of said polygons and an angle of an adjacent upper or lower polygon are arranged at different positions in a circumferential direction around center of said bottom mold.

Preferably, the side walls of the annular flat walls on the central inwardly concave dome are formed at no more than 30 degrees of inclination to a line perpendicular to the grounding bottom portion. Thus, the side walls can be easily released from the bottom mold, and also the central inwardly concave dome is protected from buckling and deformation.

It is desirable that when the annular flat walls are polygons of similar shapes, an angle of one of adjacent upper and lower polygons is arranged along a radial line connecting a substantially bisected point of one side of the other of the adjacent upper or lower polygons and center of the bottom.

Thus, the highly and the moderately stretched areas are alternately arranged along all the radial lines connecting the angles of the polygons and the center of the bottom.

According to a further aspect of the invention, there is provided a biaxially stretch blow-molded article comprising a bottom which includes a grounding bottom portion and a central inwardly concave dome being formed inside of said grounding bottom portion wherein:

each of contour lines of said central inwardly concave dome is located at a different level from said, grounding bottom portion and is defined by a concentric polygon, and an angle of one of said polygons and an angle of an adjacent upper or lower polygon are arranged at different positions in a circumferential direction around the center of said bottom.

This arrangement differs from the foregoing arrangements in that annular flat walls are not formed at different levels of the central inwardly concave dome. However, this arrangement and the other arrangements are common in that the highly stretched areas are formed by the angles of the polygons, while the moderately stretched areas are formed on the center points of sides thereof. Further, in this arrangement the side walls which connect the annular flat walls are not present, and the contour lines of the polygons are connected via the inclined surfaces.

There is further provided a bottom mold for molding a biaxially stretch blow-molded article having a bottom which includes a grounding bottom portion and a central inwardly concave dome being formed inside of said grounding bottom portion comprising:

a central convex dome having a cavity surface which defines an outer surface of said central inwardly concave dome of said article, each of contour lines of said central convex dome located at a different level from a surface corresponding to an outer surface of said grounding bottom portion being defined by a concentric polygon, wherein an angle of one of said polygons and an angle of an adjacent upper or lower polygon are arranged at different positions in a circumferential direction around center of said bottom.

Preferably, when the contour lines of the central inwardly concave dome are defined by polygons of similar shapes, an angle of one of two adjacent polygons is arranged along a radial line connecting substantially bisected point of one side of the other polygon and center of the bottom. Thus, the highly and the moderately stretched areas can be alternately arranged in a radial direction. Further, each of the inclined surfaces connecting the two adjacent upper and lower polygons is formed by an isosceles triangle comprising a vertex equals to an angle of one of the polygons and a base equals to a side of the other polygon.

According to a still further aspect of the present invention, a biaxially stretch blow-molded article comprising a bottom which includes a grounding bottom portion and a central inwardly concave dome being formed inside of said grounding bottom portion wherein:

each of contour lines of said central inwardly concave dome is located at a different level from said grounding bottom portion, and is defined by a concentric polygon whose figure is different from other polygons.

When each of the contour lines are concentric polygons whose figures are different, angles of two adjacent upper and lower polygons are not aligned around the center of the bottom. Thus, the highly and the moderately stretched areas can be alternately arranged in a radial direction.

The foregoing article is formed by a bottom mold for molding a biaxially stretch blow-molded article having a bottom which includes a grounding bottom portion and a central inwardly concave dome being formed inside of said grounding bottom portion comprising:

a central convex dome having a cavity surface which defines an outer surface of said central inwardly concave dome of said article, each of contour lines of said central convex dome located at a different level from a surface corresponding to an outer surface of said grounding bottom portion being defined by a concentric polygon whose figure is different from other polygons.

According to the foregoing aspect, it is preferable that a polygon defined by a high contour line from the grounding bottom portion has a less number of angles compared to a polygon defined by a lower contour line. Thus, it is possible to provide a relatively long side to the higher polygon. Further, it is also possible to mold the angles of the polygons precisely. Conversely, if a polygon defined by a higher contour line having an increased number of angles is formed, the sides thereof become too short, thereby making the polygon substantially circular. Therefore, it is difficult to form the angles distinctively.

In contrast, when a higher polygon having a reduced number of angles is formed at a small area, an angle of a polygon formed where two sides of such polygon intersect can be made small. Thus, by forming a small intersecting angle, it is possible to create an angle of a high polygon having a high latitudinal stretch ratio at an area having a lower longitudinal stretch ratio than the area around the grounding bottom portion. Such small angles of the polygons can function effectively as ribs.

DESCRIPTION OF PREFERRED EMBODIMENTS

Preferred embodiments of the present invention will be described hereafter with reference to the drawings.

Figure 1:
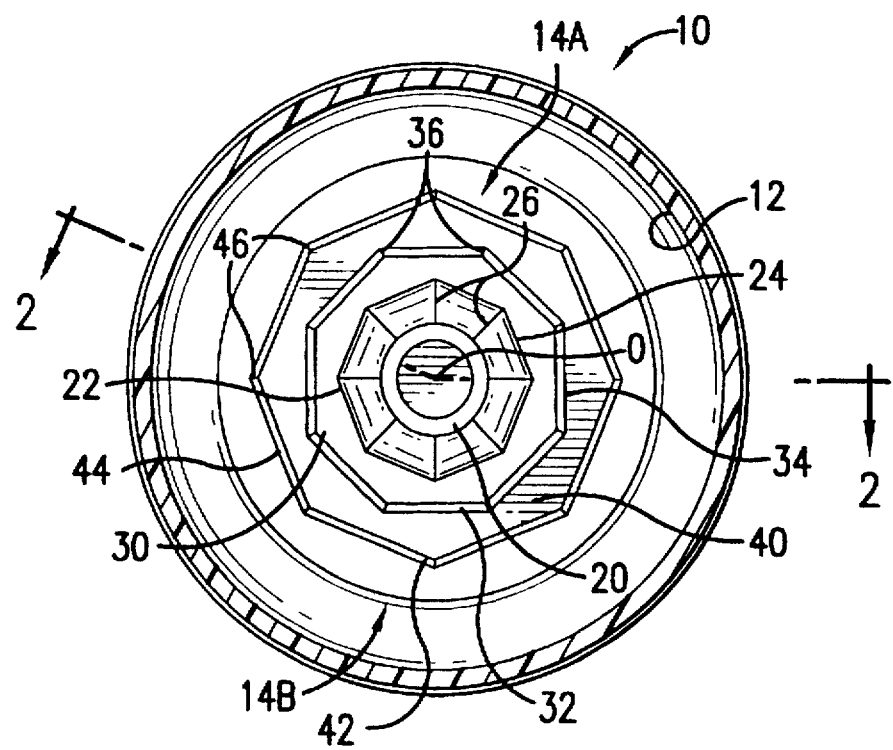
FIG. 1 is a cross-sectional view of a bottom configuration of a biaxially stretch blow-molded article in accordance with the present invention.
Figure 2:
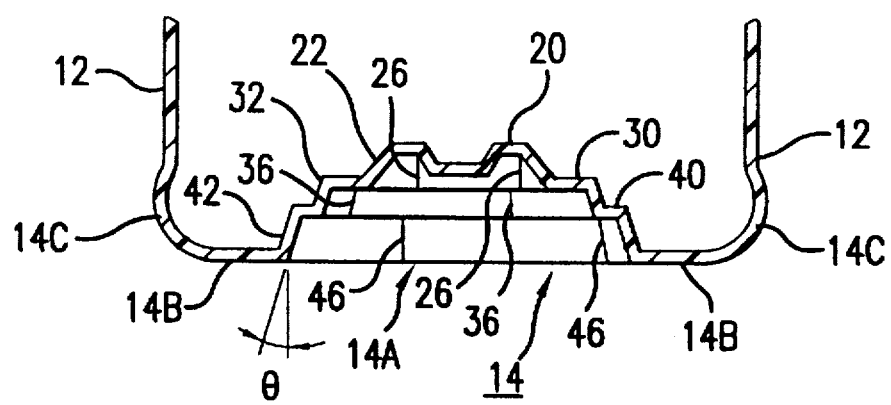
FIG. 2 is a fragmentary cross-sectional view taken on line A—A of FIG. 1.

FIG. 1 is a cross-sectional view of a bottom portion of a biaxially stretch and blow-molded article shown from the inside of the article. FIG. 2 is a cross-sectional view taken along line A—A of FIG. 1.

FIG. 2 illustrates an example of a biaxially stretch blow-molded article (called "container 10" hereinafter) made from PET resin which includes a biaxially stretched cylindrical side wall 12, and a bottom 14 formed at lower end of the side wall 12. A neck portion with an opening having a small diameter (not shown) is provided at the top of the container 10. The neck portion is integrated with the side wall 12 via a curved shoulder portion so that the diameter of the neck portion becomes smaller upwards.

As shown in FIG. 2, the bottom 14 includes a central inwardly concave dome region 14A (called "central inwardly concave dome 14A" hereinafter), a grounding bottom portion 14B extending around the central inwardly concave dome 14A, and a heel portion 14C connecting the portion 14B and the side wall 12 of the container 10. Therefore, the bottom 14 is raised from the central inwardly concave dome 14A.

The central inwardly concave dome 14A has annular flat walls 20, 30 and 40, which are in the shape of a staircase at different levels from the grounding bottom portion. The annular flat walls 20, 30 and 40 are connected via side walls 22, 32 and 42, which define shapes of the annular flat walls 20, 30 and 40, respectively. In this embodiment, the annular flat walls 20, 30 and 40 are concentric octagons. Hereinafter, the annular flat walls 20, 30 and 40 are called "octagons 20, 30 and 40". The farther from the grounding bottom portion 14B, the shorter the respective sides of the respective octagons.

As shown in FIG. 1, each of the side walls 22, 32, 42 is trapezoidal. Each of the octagons 20, 30 and 40 has eight trapezoidal side walls, respectively. As FIG. 2 illustrates, the angles of inclination (θ) of side walls 32, 42 are between 0° and 30°, and preferably between 0° and 15° with respect to a perpendicular line from the grounding bottom surface of the grounding bottom portion 14B. The inclinations of the side walls of the octagons 20, 30 and 40 cause no problem when releasing the bottom from a bottom mold. Further, these side walls 22, 32 and 42 also prevent the bottom from buckling due to a high temperature and weight of hot-filled liquid.

Referring to FIG. 1, the side walls 22, 32 and 42 have angles 26, 36 and 46 at positions where sides 24, 34 and 44 intersect one another, respectively. An angle of one of the octagons and an angle of adjacent upper or lower octagon are arranged at different locations circumferentially around the center of the bottom. For example, the angles 26 of the upper octagon 20 and the angles 36 of the middle octagon are located at different positions in a circumferential direction. The same holds true for the angles 36 of the middle octagon 30 and 46 of the lower octagon 40.

Figure 3:
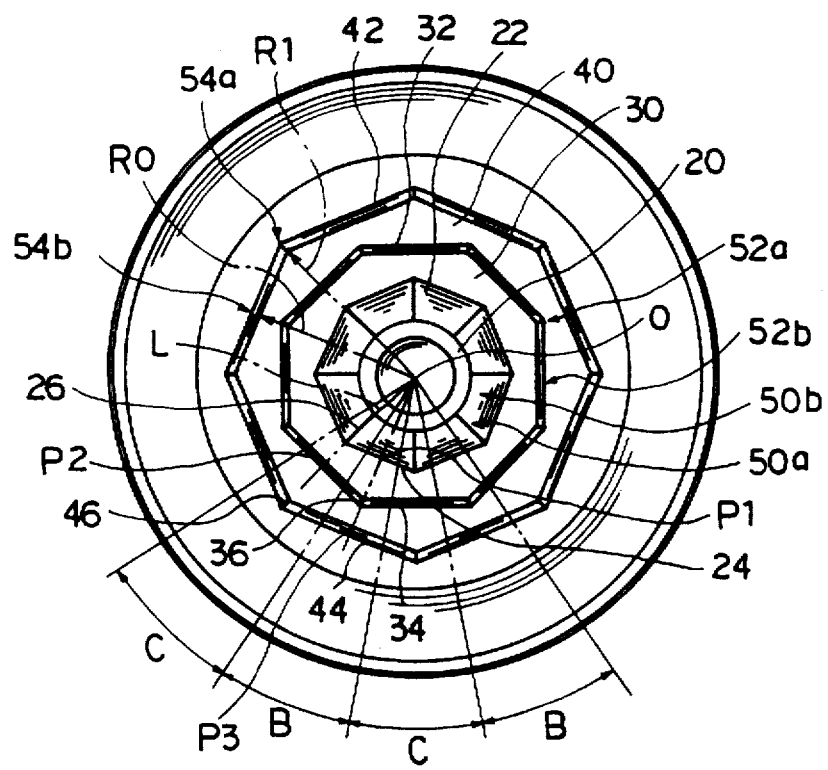
FIG. 3 is a cross-sectional view illustrating a positional relationship between angles of polygons at different levels of a biaxially stretch blow-molded article in accordance with the present invention.

As shown in FIG. 3, the angles 26 of the upper octagon 20 and the angles 46 of the lower octagon 40 are aligned along the radial lines connecting the bisected point P2 of the sides 34 of the middle octagon and the center point O. Similarly, the angles 36 of the middle octagon 30 are positioned along the radial lines connecting the bisected points P1, and P3 of the respective sides 24, 44 and the center point O.

As can be seen from FIG. 3, distances between the center point O and the side walls 22, 32 and 42 are longest at the angles 26, 36 and 46, respectively. As for the lower octagon 40, for example, the distance (R1) is longest between the center point O and the angle 46 while the distance (R0) is shortest between the center point O and the bisection P3 of the side 44. The foregoing represents that the portions near the angles 46 are most extensively stretched latitudinally when viewed in an area at the same level from the grounding bottom portion 14B. Thus, areas 54a near the angles 46 are highly stretched as shown in FIG. 3. Conversely, areas 54b near the bisected points P3 of the sides 44 of the octagon 40 are moderately stretched.

The foregoing holds true for the upper and middle octagons 20 and 30. Specifically, areas 50a and 52a near the angles 26 and 36 are highly stretched, and areas 50b and 52b near the bisected points P1 and P2 are moderately stretched.

The angles 26, 36 and 46 are the highly stretched areas, and have good heat resistance and high mechanical strength, are in the shape of edge, and function as ribs, thereby preventing the bottom 14 from being deformed.

The central inwardly concave dome 14A of the present embodiment will be described below in light of the orientation. Along contour lines at different levels from the grounding bottom portion 14B of the bottom 14, the highly stretched areas 50a, 52a and 54a and the moderately stretched areas 50b, 52b and 54b are alternately arranged circumferentially around the center point O of the central inwardly concave dome 14A. In light of the orientation radially of the center point O, the highly stretched areas and the moderately stretched areas are alternately arranged around the central inwardly concave dome 14A. For example, a certain region is arranged in the order of the highly stretched area 50a, the moderately stretched area 52b and the highly stretched area 54a. Another region is arranged in the order of the moderately stretched area 50b, the highly stretched area 52a, and the moderately stretched area 54b. Referring to FIG. 3, in a sector B, the relatively moderately stretched sides 24 and 44 are reinforced by the angle 36 which is present therebetween. In an adjacent sector C, the relatively moderately stretched side 34 is reinforced by the relatively highly stretched angles 26 and 46 at the opposite sides thereof.

Figure 4:
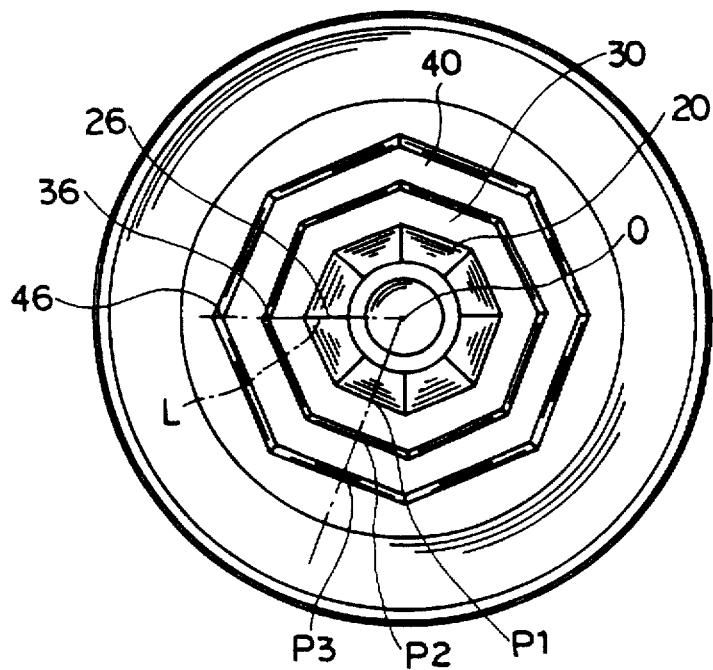
FIG. 4 is a cross-sectional view of another biaxially stretch blow-molded article for comparing and illustrating the function of an article of the present invention.

When compared with an example shown in FIG. 4, evidently the strength of the bottom configuration of the present embodiment is superior. In the configuration of FIG. 4, the angles 26, 36 and 46 of different levels are aligned on the radial lines L extending radially from the center point O of the bottom 14. In this case, the areas along the angles 26, 36 and 46 which are aligned on the same radial line L are locally and highly stretched, and have an enhanced mechanical strength. However, the bisected points P1, P2 and P3 are also aligned on straight lines, which means that these areas have very poor heat resistance, and low mechanical strength.

In the present embodiment, the highly and the moderately stretched areas are alternately arranged either circumferentially or radially around the center point O of the bottom 14, thereby assuring increased heat resistance and mechanical strength over the whole area of the central inwardly concave dome 14A.

Thus, the moderately stretched areas 50b, 52b and 54b are reinforced by the highly stretched areas 50a, 52a and 54a, thereby allowing the bottom 14 to maintain its original posture immediately after the blow molding. Therefore, when the container 10 is filled with a hot liquid, the central inwardly concave dome 14A is totally protected against projecting downward.

Further, even if the side walls 22, 32 and 42 have thick portions partially, they can be protected by the angles 26, 36 and 46, serving as ribs, against hanging down longitudinally.

Figure 5:
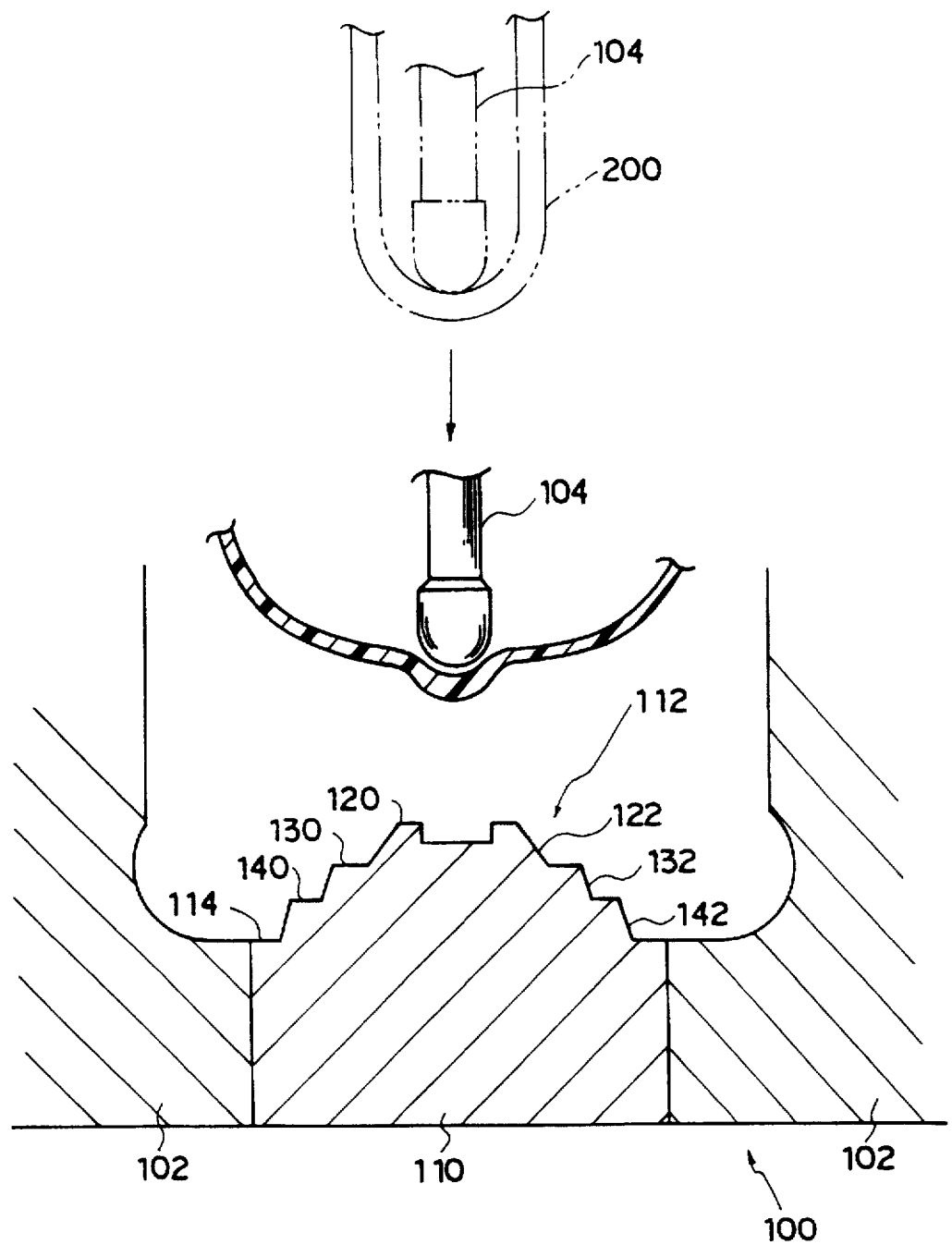
FIG. 5 is a sectional view showing a production process of articles of FIG. 1 to FIG. 3.

The method of molding the container 10 will be described with reference to FIG. 5 illustrating a bottom mold 110 which provides the bottom 14 of the container 10.

Referring to FIG. 5, a blow cavity mold 100 including a pair of mold halves 102 and a bottom mold 110 is used to biaxially stretch and blow-mold a preform 200 to obtain the container 10. The preform 200 placed in the blow cavity mold 100 is stretched longitudinally by longitudinal movements of a stretching rod 104. Concurrently with the longitudinal stretching, air is blown into the preform 200 via a blow core mold (not shown) so as to stretch the preform 200 latitudinally.

The bottom mold 110 has a central convex dome 112 which corresponds to the shape of the central inwardly concave dome 14A formed in the bottom 14 of the container 10. The central convex dome 112 has annular flat walls 120, 130 and 140 at different levels from a cavity surface 114 for defining the grounding bottom portion 14B of the container 10. Side walls 122, 132 and 142 are disposed between the annular flat walls 120, 130 and 140 so as to connect these flat walls on the different levels. Each of the side walls 122, 132 and 142 forms a concentric regular octagon. Since the walls 120, 130, 140 and side walls 122, 132 and 142 have the same shape as the shape of the bottom 14 of the container 10 as shown in FIG. 1, they will not be described in detail.

The bottom 14 of the container 10 is brought into contact with the bottom mold 100 by the stretch rod 104 under the blow pressure so as to be shaped. When the bottom mold 110 is vertically movable, the bottom 14 is pushed upward by the bottom mold 100 moving upward so as to be shaped.

When the bottom 14 is biaxially stretched and oriented, it comes into contact with the central convex dome 112 of the bottom mold 110, is pushed upward by the bottom mold 110, and is shaped into the central inwardly concave dome 14A. Therefore, resin is stretched and oriented longitudinally. Further, the resin is longitudinally stretched and oriented at the side walls 122, 132 and 142 thus increasing the degree of longitudinal orientation. The bottom 14 of the container 10 as shown in FIGS. 1–3 is molded in such a manner that each of the side walls 22, 32 and 42 has the shape of an octagon, which means that the resin is latitudinally stretched. Compared with the circular side walls of the prior art, the side walls 22, 32 and 42 of this embodiment is extensively stretched latitudinally. In other words, the distances between the angles 26, 36 and 46 and the center point O of the central inwardly concave dome 14A are longer than the distances between the sides 24, 34 and 44 and the center point O. Thus, the angles 26, 36 and 46 are more extensively and latitudinally oriented and crystallized. In this state, since the resin is not stretched so as to reach deep portions of the bottom mold, it is not necessary to raise the blow pressure as high as in the prior art practice.

The present invention will be described hereinafter with respect to another embodiment shown in FIG. 6. In another embodiment, the bottom configuration differs from that of FIG. 1 in that it does not have the annular flat walls 20, 30 and 40 in the shape of a staircase.

Figure 6:
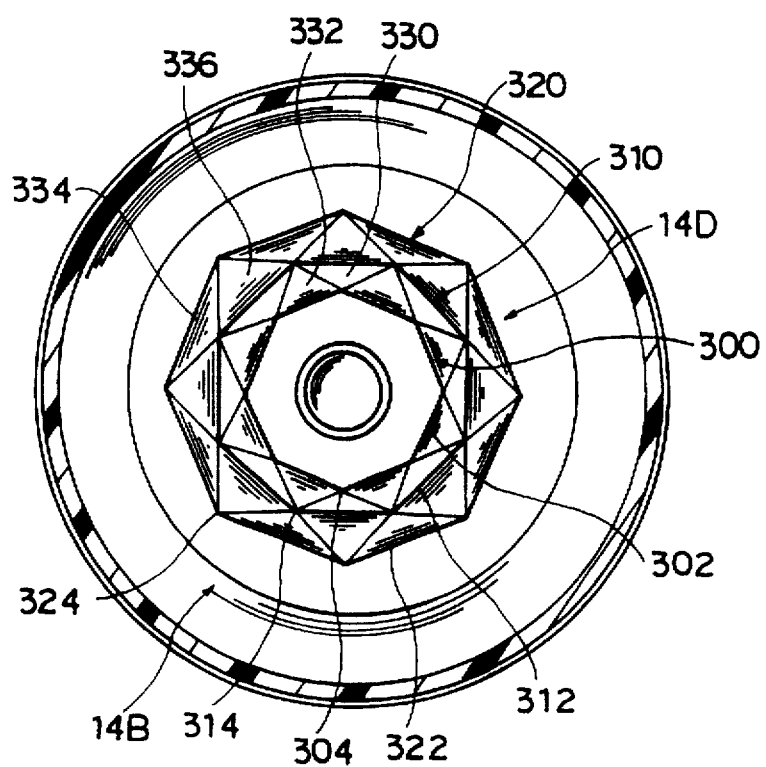
FIG. 6 is a cross-sectional view of a biaxially stretch blow-molded article in accordance with another embodiment of the present invention.

Referring to FIG. 6, the central inwardly concave dome 14D has upper, middle and lower regular octagons defined by contour lines 300, 310 and 320 at different levels. Each of the octagons defined by the contour lines 300, 310 and 320 has eight sides 302, 312 and 322 and eight angles 304, 314 and 324, respectively. The angles 304, 314 and 324 of the octagons are arranged similarly to the angles 26, 36 and 46 of the octagons shown in FIG. 1.

Areas between the octagons defined by the contour lines 300, 310 and 320 are formed at the inclined surfaces of a plurality of isosceles triangles 330 and 332, and 334 and 336. For example, with the octagons defined by the contour lines 300 and 310, each isosceles triangle 330 has a vertex at the angle 304 and a base equals to one of the sides 312 of the octagon defined by the middle contour line 310. Each isosceles triangle 332 of the foregoing octagon has a vertex at the angle 314 and a base equals to the side 302 of the octagon defined by the contour line 300. With the inclined surface defined by the contour lines 310 and 320, the isosceles triangles 334 and 336 are also configured in the similar manner.

In another embodiment shown in FIG. 6, highly stretched areas near the angles 304, 314 and 324 and moderately stretched areas near the sides 302, 312 and 322 are alternately arranged either circumferentially or radially around the center point as shown in FIG. 1. Therefore, it is possible to enhance the heat resistance and mechanical strength of the central inwardly concave dome 14D similarly to the embodiment of FIG. 1.

As shown in FIG. 6, a bottom mold for molding the bottom comprises a central convex dome which has a cavity surface for forming the central inwardly concave dome 14D of the container 10. In this case, a central convex dome of the bottom mold has concentric octagons which are defined by different contour lines from a surface corresponding to an outer surface of the grounding bottom portion 14B. In the bottom mold, the contour lines on the central convex dome are required to coincide with the contour lines 300, 310 and 320 on the central inwardly concave dome 14D of the container shown in FIG. 6 Referring to FIG. 7, still another embodiment of the invention will be described hereinafter. This embodiment is characterized in that the number of angles of polygons on the central inwardly concave dome is reduced toward the center of the central inwardly concave dome.

The central inwardly concave dome 14E of the bottom 14 includes a plurality of annular flat walls, i.e. polygons, 400, 410 and 420, at different levels which are connected via side walls 402, 412 and 422 thus shaping the walls polygonal. The polygons 400, 410 and 420 reduce the number of angles toward the center of the central inwardly concave dome 14E.

Figure 7:
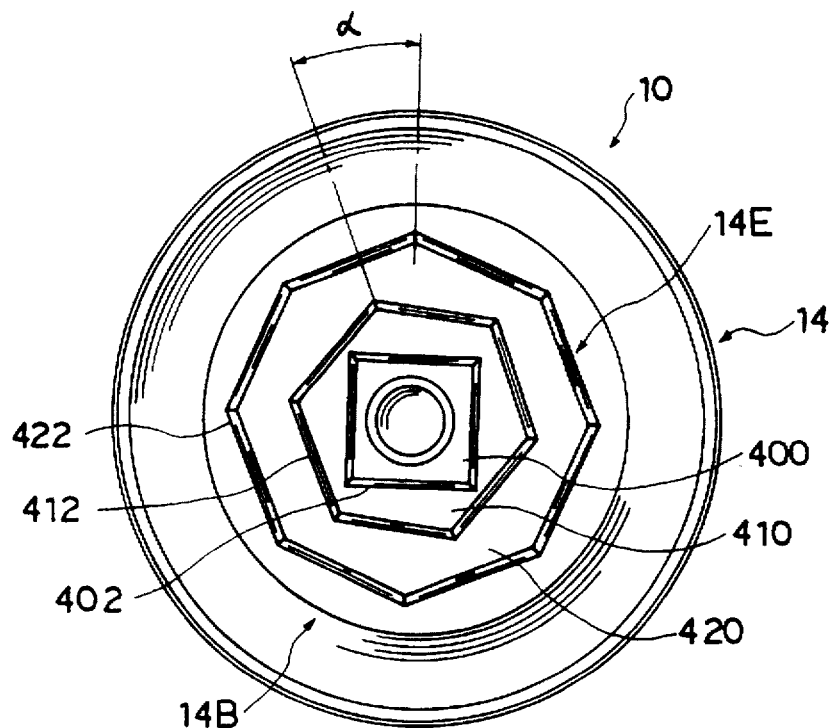
FIG. 7 is a cross-sectional view of a biaxially stretch blow-molded article in accordance with still another embodiment of the present invention.

As shown in the embodiment of FIG. 7, the lower polygon defined by the side wall 422 is octagonal. The middle polygon defined by the side wall 412 is hexagonal. Finally, the upper polygon defined by the side wall 402 is rectangular. Reduction in the number of angles of the upper and middle polygons can prevent the sides of the polygons from becoming short. In other words, if a plurality of polygons having the same number of angles are arranged on each level, the length of the sides of the upper polygon will be shortened, and the polygons become substantially circular. In such a case, it will be very difficult to precisely shape the octagons at the angles thereof. In this embodiment, the angles of the upper polygon can be precisely shaped.

When the polygons on the respective levels do not have similar figures, an angle of one of the polygons and an angle of an adjacent upper or lower polygon can be arranged at different positions in a circumferential direction as shown in the embodiments of FIG. 1 and FIG. 6. In the example of FIG. 7, the lower octagon defined by the side wall 422 and the middle hexagon defined by the side wall 412 are arranged in such a manner that the angles of the octagon and the hexagon are not aligned in a circumferential direction. Alternatively, at least one of the angles of the polygons may be aligned in a circumferential direction as shown in FIG. 8.

Figure 8:
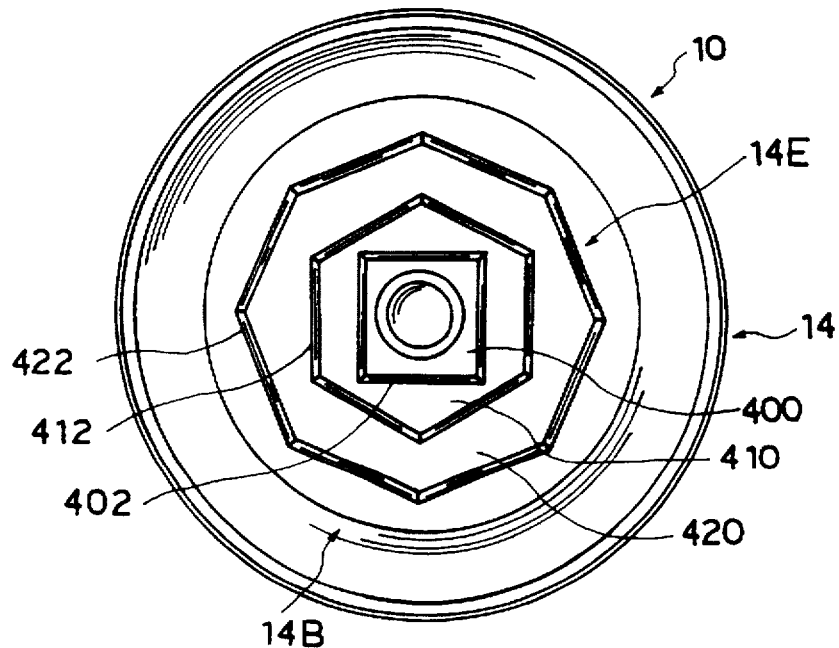
FIG. 8 is a cross-sectional view of a biaxially stretch blow-molded article in accordance with still another embodiment of the present invention.

In each of the respective embodiments of FIG. 7 and FIG. 8, the central inwardly concave dome 14E has a plurality of annular flat walls at different levels. Alternatively, the central inwardly concave dome 14E may be configured in a similar shape without annular flat walls as shown in FIG. 6.

In order to blow-mold the bottom 14 which has the central inwardly concave dome 14E as shown in FIGS. 7 and 8, bottom molds which have a central convex dome with a cavity surfaces in conformity with the configuration of the central inwardly concave dome 14E may be used.

According to each of the embodiments, the container is characterized in that it includes an improved central inwardly concave dome with a plurality of various polygons in the shape of staircase compared with the ordinary plain concave dome of the prior art, and that it has an attractive appearance.

While the above description constitutes the preferred embodiments of the present invention, the present invention is susceptible to modification, variation and change without departing from the scope of the claims.

Needless to say, the number of angles of polygons may be varied with the size of the container. Importantly, the bottom of the container should be formed into a shape which requires an increased latitudinal ratio stretch.

Further, the levels of the central inwardly concave dome where the polygons are formed may be increased in accordance with the size of the container, although only three levels are described in the embodiments shown in FIGS. 1, 7 and 8. Conversely, the number of levels may be reduced for a smaller container.

What is claimed is:

1. A biaxially stretch blow-molded article comprising a bottom which includes a grounding bottom portion and a central inwardly concave dome being formed inside of said grounding bottom portion wherein:

said central inwardly concave dome comprises highly stretched areas and moderately stretched areas which are alternately formed circumferentially around a center of said bottom along contour lines each of which is located at a different level from said grounding bottom portion, and said highly stretched areas along each contour line and said moderately stretched areas are alternately arranged along a radial line from said center.

2. The article as defined in claim 1, wherein said highly stretched areas and said moderately stretched areas are alternately arranged circumferentially around said center along each of said contour lines, wherein said highly stretched areas are farther from said center than said moderately stretched areas.

3. A biaxially stretch blow-molded article comprising a bottom which includes a grounding bottom portion and a central inwardly concave dome being formed inside of said grounding bottom portion wherein:

said central inwardly concave dome comprises annular flat walls which are formed at different levels from said grounding bottom portion, wherein said annular flat walls are defined by concentric polygons, and an angle of one of said polygons and an angle of an adjacent upper or lower polygon are arranged at different positions in a circumferential direction around a center of said bottom.

4. The article as defined in claim 3, wherein side walls of said annular flat walls are formed at no more than 30 degrees of inclination to a line perpendicular to an outer surface of said grounding bottom portion.

5. The article as defined in claim 3, wherein said annular flat walls are polygons of similar figures, an angle of one of said polygons is arranged along a radial line connecting a substantially bisected point of one side of said adjacent upper or lower polygon and said center of said bottom.

6. The article as defined in claim 5, wherein side walls of said annular flat walls are formed at no more than 30 degrees of inclination to a line perpendicular to an outer surface of said grounding bottom portion.

7. The article as defined in claim 3, being thermal resistant to liquid filled at a high temperature.

8. The article as defined in claim 7, being made from polyethylene terephthalate resin.

9. A biaxially stretch blow-molded article comprising a bottom which includes a grounding bottom portion and a central inwardly concave dome being formed inside of said grounding bottom portion wherein;

said central inwardly concave dome comprises contour lines, wherein each of said contour lines is located at a different level from said grounding bottom portion and is defined by a concentric polygon, wherein an angle of one of said polygons and an angle of an adjacent upper or lower polygon are arranged at different positions in a circumferential direction around a center of said bottom.

10. The article as defined in claim 9, wherein said contour lines are defined by polygons of similar figures, and wherein an angle of one of said polygons is being arranged along a radial line connecting a substantially bisected point of one side of said adjacent upper or lower polygon and said center of said bottom.

11. The article as defined in claim 10, wherein an area connecting said adjacent upper or lower polygon is formed by a plurality of inclined surfaces each of which is defined by an isosceles triangle comprising a vertex equal to said angle of one of said polygons and a base equal to one side of the other of said polygons.

12. A biaxially stretch blow-molded article comprising a bottom which includes a grounding bottom portion and a central inwardly concave dome being formed inside of said grounding bottom portion wherein:

said central inwardly concave dome comprises contour lines, wherein each of said contour lines is located at a different level from said grounding bottom portion, and wherein each of said contour lines is defined by a concentric polygon, the concentric polygon of each of said contour lines having a different figure than a concentric polygon defining another contour line.

13. The article as defined in claim 12, wherein a polygon at a higher level from said grounding bottom portion has less angles compared to a polygon at a lower level from said grounding bottom portion.

* * * * *